United States Patent
Katsurahira et al.

(10) Patent No.: US 10,296,039 B2
(45) Date of Patent: May 21, 2019

(54) ANALOG CIRCUIT, POSITION INDICATOR, AND SYSTEM

(71) Applicant: Wacom Co., Ltd., Saitama (JP)

(72) Inventors: Yuji Katsurahira, Saitama (JP); Takeshi Koike, Kanagawa (JP); Hideyuki Hara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/832,318

(22) Filed: Dec. 5, 2017

(65) Prior Publication Data

US 2018/0095495 A1 Apr. 5, 2018

Related U.S. Application Data

(63) Continuation of application No. PCT/JP2016/076891, filed on Sep. 13, 2016.

(51) Int. Cl.
| | |
|---|---|
| *G09G 5/00* | (2006.01) |
| *G06F 1/12* | (2006.01) |
| *G06F 1/24* | (2006.01) |
| *G06F 3/0354* | (2013.01) |
| *G06F 3/038* | (2013.01) |
| *G06F 3/041* | (2006.01) |
| *G06F 3/044* | (2006.01) |

(52) U.S. Cl.
CPC .................. *G06F 1/12* (2013.01); *G06F 1/24* (2013.01); *G06F 3/0383* (2013.01); *G06F 3/03545* (2013.01); *G06F 3/044* (2013.01); *G06F 3/0416* (2013.01)

(58) Field of Classification Search
CPC ......... G06F 2203/04101; G06F 3/0383; G06F 3/046; G06F 2203/04106; G06F 1/12; G06F 1/24; G06F 3/044

USPC .................................................. 345/174, 179
See application file for complete search history.

(56) References Cited

U.S. PATENT DOCUMENTS

| | | | |
|---|---|---|---|
| 9,501,091 | B2 | 11/2016 | Takeda et al. |
| 9,727,166 | B2 | 8/2017 | Takeda et al. |
| 2013/0106797 | A1 | 5/2013 | Pant et al. |

(Continued)

FOREIGN PATENT DOCUMENTS

| | | |
|---|---|---|
| JP | 2015-130409 A | 7/2015 |
| JP | 5886478 B2 | 3/2016 |

(Continued)

OTHER PUBLICATIONS

Hamaguchi et al., "A 240Hz-Reporting-Rate Mutual-Capacitance Touch-Sensing Analog Front-End Enabling Multiple Active/Passive Styluses with 41 dB/32dB SNR for 0.5mm Diameter" *2015 IEEE International Solid-State Circuits Conference*, San Francisco, California, Feb. 22-26, 2015, pp. 120-122.

*Primary Examiner* — Jennifer T Nguyen
(74) *Attorney, Agent, or Firm* — Seed IP Law Group LLP

(57) ABSTRACT

A low-power-consumption, noise-immune analog circuit for a position indicator is provided. The analog circuit provided by the present disclosure is connected to an electrode that receives a control signal by capacitive coupling, and includes an edge detection circuit and a waveform restoration circuit. The edge detection circuit detects rising and falling edges of the control signal received by the electrode. The waveform restoration circuit restores the waveform of the control signal in accordance with the rising and falling edges detected by the edge detection circuit.

10 Claims, 5 Drawing Sheets

(56) References Cited

U.S. PATENT DOCUMENTS

2017/0108984 A1 4/2017 Takaya et al.
2017/0123519 A1* 5/2017 Reitan ................ G06F 3/03545

FOREIGN PATENT DOCUMENTS

JP           5905645 B2   4/2016
WO      2016/002371 A1   1/2016

* cited by examiner (a) Pos_L (b) Pos_H (c) Pos_H (ENLARGED)

ANALOG CIRCUIT, POSITION INDICATOR, AND SYSTEM

BACKGROUND

Technical Field

The present disclosure relates to an analog circuit, a position indicator, and a system, and more particularly, to an analog circuit, a position indicator, and a system for supporting the position indicator capable of receiving a control signal transmitted from a tablet.

Description of the Related Art

A position detection device formed of a tablet and an active stylus (hereinafter simply referred to as the "stylus") acting as a position indicator having a built-in power supply is configured to permit the stylus to receive a control signal transmitted from the tablet. Examples of such a position detection device are disclosed in Patent Documents 1 and 2 and in Non-Patent Document 1. In a configuration disclosed in Non-Patent Document 1, the stylus includes an analog front-end for receiving the control signal from the tablet.

FIG. 10 is a diagram illustrating an example of a control signal receiver circuit that is included in a stylus according to the background art of the present disclosure. As indicated in the figure, a stylus 100 in the illustrated example includes an electrode 101, a receiver circuit 102, and a controller 103. The receiver circuit 102 includes an amplifier circuit 110, a high-bit analog to digital (AD) converter circuit 111, and a matched filter 112. The amplifier circuit 110 and the high-bit AD converter circuit 111 are analog circuits 120. The matched filter 112 and the controller 103 are digital circuits 121.

The electrode 101 receives a control signal from a tablet. The control signal received in this manner is generated in the tablet by using a known spread spectrum code to spread a command indicative of an instruction for the stylus. The control signal received by the electrode 101 is first amplified by the amplifier circuit 110, and then multi-level sampled by the high-bit AD converter circuit 111, which operates in synchronism with a clock signal CLK supplied from the outside, and supplied to the matched filter 112 as a multi-level digital signal. The matched filter 112 calculates the correlation value between the multi-level digital signal sequentially inputted from the high-bit AD converter circuit 111 and the known spread spectrum code (used by the tablet to generate the control signal), and outputs the result of calculation to the controller 103. When a peak is indicated by the result of correlation value calculation, which is inputted as described above, the controller 103 determines that one bit of the control signal is detected, and acquires the command transmitted by the tablet from the result of determination.

PRIOR ART DOCUMENT

Patent Documents

Patent Document 1: Japanese Patent No. 5905645
Patent Document 2: U.S. Unexamined Patent Application Publication No. 2013/0106797
Non-Patent Document 1: Mutsumi Hamaguchi, Michiaki Takeda, Masayuki Miyamoto, "A 240 Hz-Reporting-Rate Mutual Capacitance Touch-Sensing Analog Front-End Enabling Multiple Active/Passive Styluses with 41 dB/32 dB SNR for 0.5 mm Diameter," IEEE International Solid-State Circuits Conference, 2015, pp. 120 to 122

BRIEF SUMMARY

Technical Problem

The receiver circuit 102 depicted in FIG. 10 is immune to various types of noise, such as low-frequency noise, high-frequency noise, and multi-path noise. A main reason is that multi-level sampling is performed. Meanwhile, the receiver circuit 102 depicted in FIG. 10 has a problem where the analog circuits 120 in particular consume a considerable amount of power. The main reason is also that multi-level sampling is performed. More specifically, the high-bit AD converter circuit 111 consumes a large amount of current. It is demanded that the stylus operate for a long period of time from a small-capacity battery. Therefore, such a considerable amount of power consumption has posed a problem from the viewpoint of battery life.

If two-level sampling (i.e., simple magnitude comparison) is performed instead of multi-level sampling, a low-power-consumption comparator can be used in place of the high-bit AD converter circuit 111. This achieves low power consumption. However, the advantage of being immune to noise is lost by the use of a low-power-consumption comparator. If, for example, low-frequency noise is superimposed upon a received signal, either high or low is consecutively received without regard to the amplitude of a control signal at a point of time when the amplitude of the low-frequency noise is great. This results in the loss of information carried by the control signal. Under such circumstances, a low-power-consumption, noise-immune receiver circuit for a stylus has been desired.

According to an disclosure disclosed in a patent application (Japanese Patent Application No. 2015-130409) previously filed by the inventors of the present disclosure, two types of control signals differing in frequency or modulation are used to reduce the power consumption of a stylus in a standby state. However, this disclosure still does not reduce the power consumption during a period where the stylus and a tablet exchange data.

In view of the above circumstances, an aspect of the present disclosure is to provide a low-power-consumption, noise-immune analog circuit for a position indicator, a position indicator that uses such an analog circuit to receive a control signal transmitted from a sensor controller, and a system that includes such a position indicator.

Technical Solution

An analog circuit provided by the present disclosure is connected to an electrode that receives a control signal by capacitive coupling, and includes an edge detection circuit and a waveform restoration circuit. The edge detection circuit detects rising and falling edges of the control signal received by the electrode. The waveform restoration circuit restores the waveform of the control signal in accordance with the rising and falling edges detected by the edge detection circuit.

A position indicator provided by the present disclosure includes an electrode and a receiver circuit. The electrode receives a control signal by capacitive coupling. The receiver circuit decodes the control signal received by the electrode. The receiver circuit includes an edge detection circuit, a waveform restoration circuit, and a decoding circuit. The edge detection circuit detects the rising and falling edges of the control signal received by the electrode. The waveform restoration circuit restores the waveform of the control signal in accordance with the rising and falling edges detected by the edge detection circuit. The decoding circuit decodes the control signal in accordance with the waveform restored by the waveform restoration circuit.

A system provided by the present disclosure includes a tablet and a position indicator. The tablet includes a sensor controller and a first electrode. The sensor controller generates a control signal in accordance with a command indicative of an instruction for the position indicator. The first electrode transmits the control signal. The position indicator includes a second electrode and a receiver circuit. The second electrode receives the control signal by capacitive coupling with the first electrode. The receiver circuit decodes the control signal received by the second electrode. The receiver circuit includes an edge detection circuit, a waveform restoration circuit, and a decoding circuit. The edge detection circuit detects the rising and falling edges of the control signal received by the second electrode. The waveform restoration circuit restores the waveform of the control signal in accordance with the rising and falling edges detected by the edge detection circuit. The decoding circuit decodes the control signal in accordance with the waveform restored by the waveform restoration circuit.

Advantageous Effects

According to the present disclosure, the waveform of a control signal can be suitably restored even when low-frequency noise is superimposed upon the control signal. Because noise causing a substantial problem for a position indicator is limited to low-frequency noise, it can be said that the present disclosure makes it possible to obtain a noise-immune analog circuit for the position indicator.

Further, according to the present disclosure, the waveform of the control signal can be restored without performing multi-level sampling. Consequently, lower power consumption can be achieved than the example depicted in FIG. 10, which uses the high-bit AD converter circuit 111.

BRIEF DESCRIPTION OF THE SEVERAL VIEWS OF THE DRAWINGS

FIG. 2(a) depicts a case where the control signal US_cmd is spread by using a known spread spectrum code. FIG. 2(b) depicts a case where the control signal US_cmd is modulated by phase-shift keying (PSK). FIG. 2(c) depicts a case where the control signal US_cmd is baseband-transmitted.

FIG. 3(a) illustrates an example of a waveform of the control signal US_cmd received in a situation where a stylus 2 is at a position Pos_L depicted in FIG. 1. FIG. 3(b) illustrates an example of a waveform of the control signal US_cmd received in a situation where the stylus 2 is at a position Pos_H depicted in FIG. 1. FIG. 3(c) is an enlarged view obtained by enlarging FIG. 3(b) in the v-axis direction.

FIG. 8(a) is a diagram illustrating a concrete example of a configuration of a positive peak detection circuit 82a depicted in FIG. 7. FIG. 8(b) is a diagram illustrating a concrete example of a configuration of a negative peak detection circuit 83a depicted in FIG. 7.

DETAILED DESCRIPTION

Embodiments of the present disclosure will now be described in detail with reference to the accompanying drawings.

Figure 1:
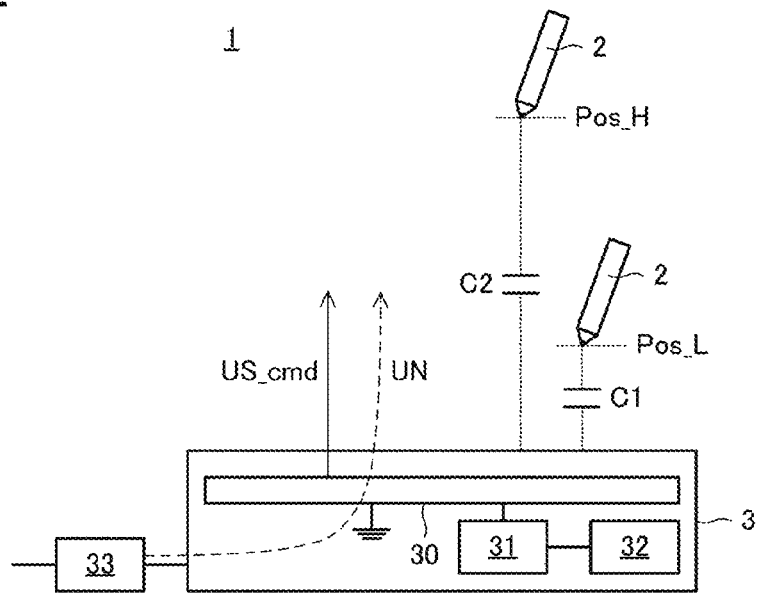
FIG. 1 is a diagram illustrating a configuration of a position detection system 1 according to an embodiment of the present disclosure.

FIG. 1 is a diagram illustrating a configuration of a position detection system 1 according to an embodiment of the present disclosure. As illustrated in the figure, the position detection system 1 includes a stylus 2 (position indicator) and a tablet 3 (position detection device). The tablet 3 includes a sensor 30 (first electrode), a sensor controller 31, and a host processor 32. The sensor 30 forms a touch surface. The host processor 32 controls various elements of the sensor controller 31. The tablet 3 is connected to a charger 33 (alternating-current (AC) adapter) and operable on electrical power that is supplied from a system power supply through the charger 33.

FIG. 1 presents two images of the stylus 2. These images represent the same stylus 2 and indicate different distances from the touch surface. As illustrated in the figure, capacitance (capacitance C1 or C2 in FIG. 1) is generated between the stylus 2 and the sensor 30. The stylus 2 is able to communicate with the sensor controller 31 in the tablet 3 by exchanging electrical charge through the capacitance (by capacitive coupling).

Two-way communication is established between the stylus 2 and the sensor controller 31. FIG. 1 depicts only a control signal US_cmd transmitted from the sensor controller 31 to the stylus 2. The control signal US_cmd is a signal indicative of a command (instruction) for the stylus 2. Upon receipt of the control signal US_cmd, the stylus 2 performs a process in accordance with an instruction indicated by the control signal US_cmd. If the transmission of data is indicated by the instruction, the stylus 2 acquires the data and transmits the acquired data to the sensor controller 31. The data transmitted in this manner includes, for example, a unique identification (ID) of the stylus 2, a pen pressure indicative of pressure applied to the pen tip of the stylus 2 from the touch surface, and on/off information about a switch included in the stylus 2.

Figure 3:
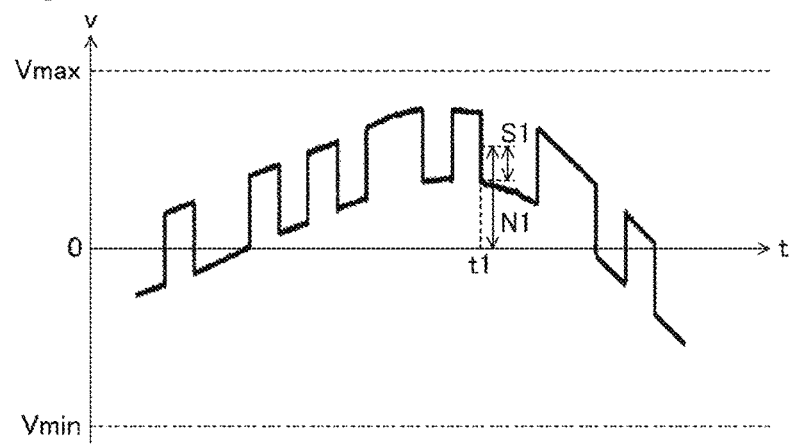
FIG. 3 includes diagrams illustrating examples of a waveform of the control signal US_cmd.
Figure 3:
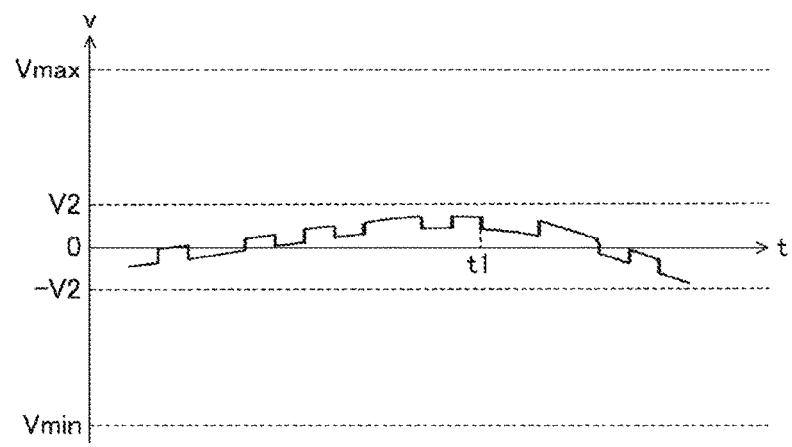
Figure 3:
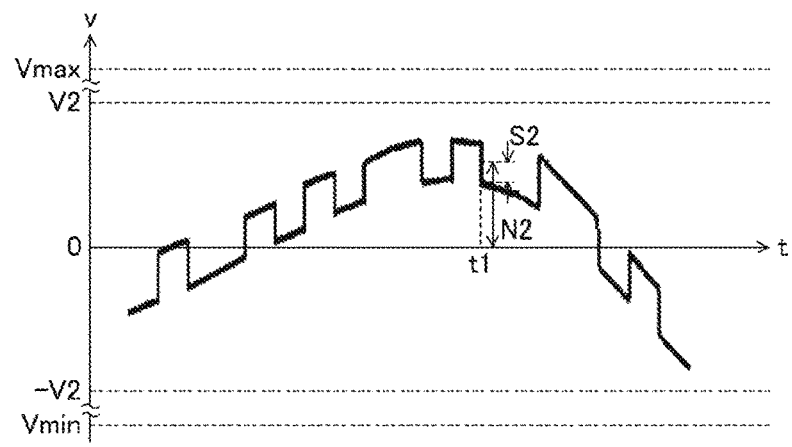

The strength (reception strength) of the control signal US_cmd received by the stylus 2 increases with a decrease in the distance between the stylus 2 and the sensor 30. The reason is that the capacitance generated between the stylus 2 and the sensor 30 increases. For example, the capacitance C1 generated with respect to the sensor 30 when the stylus 2 is at a relatively low position Pos_L (at a position relatively close to the touch surface) is greater than the capacitance C2 generated with respect to the sensor 30 when the stylus 2 is at a relatively high position Pos_H (at a position relatively far from the touch surface). Therefore, the reception strength of the control signal US_cmd at the position Pos_L is greater than the reception strength of the control signal US_cmd at the position Pos_H. This aspect will be described later in more detail with reference to FIG. 3.

Figure 2:
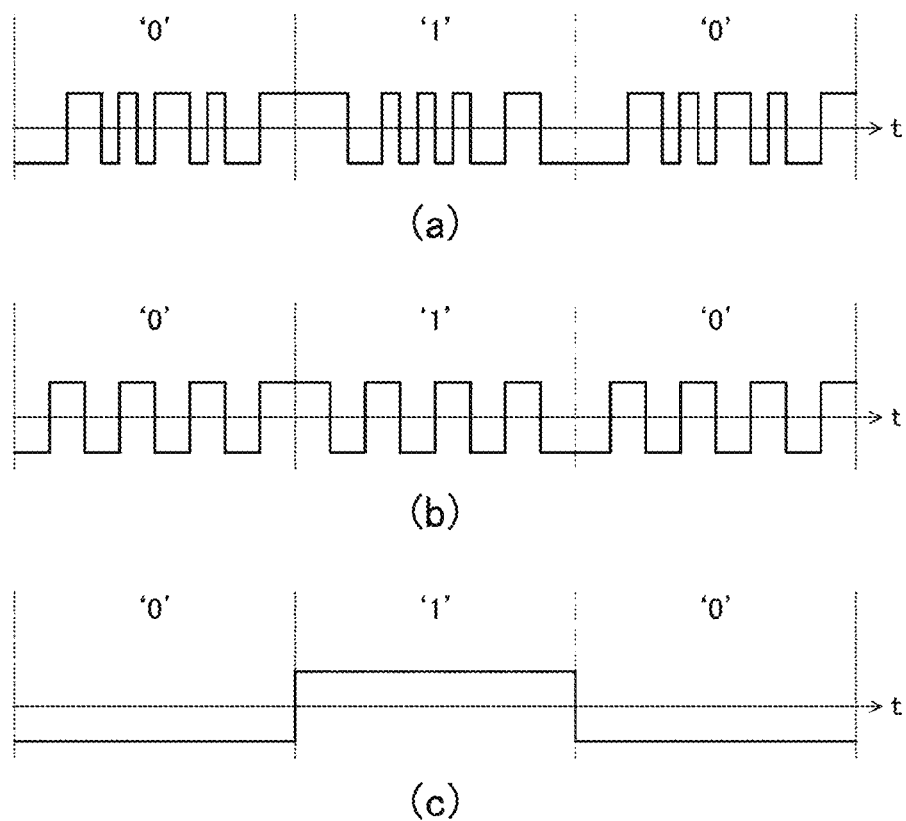
FIG. 2 includes diagrams illustrating concrete examples of a control signal US_cmd.

FIG. 2 includes diagrams illustrating concrete examples of the control signal US_cmd. FIG. 2(a) depicts a case where the control signal US_cmd is spread by using a known spread spectrum code. FIG. 2(b) depicts a case where the control signal US_cmd is modulated by phase-shift keying (PSK). FIG. 2(c) depicts a case where the control signal US_cmd is baseband-transmitted. As illustrated in FIG. 2, the control signal US_cmd may be transmitted in various manners.

More specifically, FIG. 2(a) illustrates an example in which a spread spectrum code of 0x1AD3 (0001101011010011) is assigned to transmission data "0" and a spread spectrum code of 0xE54C (1110010101001100) is assigned to transmission data "1." In this example, therefore, the sensor controller 31 transmits a chip sequence of "0x1AD3" when transmitting "0," and transmits a chip sequence of "0xE54C" when transmitting "1."

FIG. 2(b) illustrates an example in which a phase of 0 degrees is assigned to the transmission data "0," and a phase of 180 degrees is assigned to the transmission data "1." In this example, therefore, the sensor controller 31 transmits a carrier signal at a phase of 0 degrees when transmitting "0," and transmits a carrier signal at a phase of 180 degrees when transmitting "1."

FIG. 2(c) illustrates an example in which a minus voltage is assigned to the transmission data "0," and a plus voltage is assigned to the transmission data "1." In this example, therefore, the sensor controller 31 transmits a minus voltage when transmitting "0," and transmits a plus voltage when transmitting "1."

No matter which of the methods depicted in FIGS. 2(a) to 2(c) is adopted, the control signal US_cmd alternates between low and high. The most basic method of receiving such a signal is two-level sampling, which is mentioned earlier. That is to say, the stylus 2 can restore the control signal US_cmd transmitted from the sensor controller 31 by using a threshold value between low and high voltage values to determine the amplitude of a received signal.

However, low-frequency noise UN depicted in FIG. 1 is often superimposed upon the control signal US_cmd. The low-frequency noise UN is generated, for example, from the charger 33 depicted in FIG. 1 or other noise source existing in the vicinity of the sensor controller 31. The low-frequency noise UN makes it difficult to perform two-level sampling to restore the control signal US_cmd. This aspect will be described in detail below with reference to actual examples of the signal.

FIG. 3(a) is a diagram illustrating an example of a waveform of the control signal US_cmd received in a situation where the stylus 2 is at the position Pos_L depicted in FIG. 1. In FIG. 3(a) and in FIGS. 3(b) and 3(c), which will be described later, the vertical axis represents a voltage v received by the stylus 2, and the horizontal axis represents time t. Voltages Vmax, Vmin depicted in FIG. 3(a) respectively denote the maximum and minimum values of the voltage detected by the stylus 2 at the position Pos_L.

The low-frequency noise UN is superimposed upon the control signal US_cmd illustrated in FIG. 3(a). In the central region of the figure, the received voltage v remains in the plus (v>0) state, regardless of the original amplitude of the control signal US_cmd. In this state, the original waveform of the control signal US_cmd cannot be restored by performing two-level sampling using v=0 as the threshold value. This can be explained from a different point of view. As noise N1 (>S1) greater than the amplitude S1 of the control signal US_cmd is superimposed at time t1 depicted in FIG. 3(a), the received voltage v is plus despite that the original amplitude of the control signal US_cmd is minus at time t1 and thereafter. Consequently, the result of determination made upon two-level sampling is high. That is to say, the result of determination made upon two-level sampling does not reflect the original amplitude of the control signal US_cmd.

Figure 10:
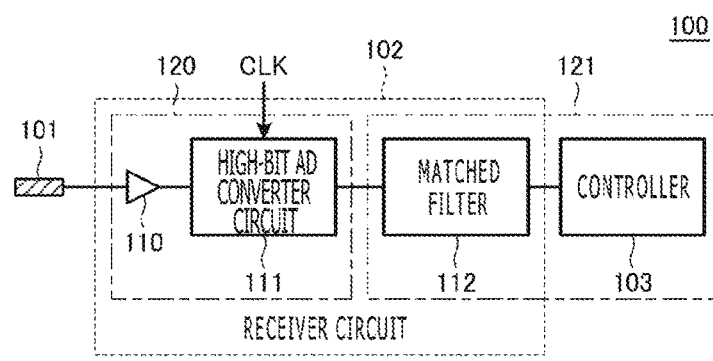
FIG. 10 is a diagram illustrating an example of a control signal receiver circuit for a stylus according to the background art of the present disclosure.

As described above, when the low-frequency noise UN is superimposed upon the control signal US_cmd, it is difficult to properly receive the control signal US_cmd using two-level sampling. An aspect of the present disclosure is to properly receive the control signal US_cmd even in the above situation without using a high-power-consumption circuit such as the high-bit AD converter circuit 111 depicted in FIG. 10.

FIG. 3(b) is a diagram illustrating an example of the waveform of the control signal US_cmd received in a situation where the stylus 2 is at the position Pos_H depicted in FIG. 1. FIG. 3(c) is an enlarged view obtained by enlarging FIG. 3(b) in the v-axis direction. The waveforms depicted in FIGS. 3(b) and 3(c) are drawn on the assumption that the same control signal US_cmd as indicated in FIG. 3(a) is received at the position Pos_H instead of the position Pos_L.

As is obvious from the comparison between FIGS. 3(b) and 3(a), the voltage v received at the position Pos_H is lower, as a whole, than the voltage v received at the position Pos_L. The reason is that the control signal US_cmd and the low-frequency noise UN greatly attenuate due to an increase in the distance to the touch surface. The voltages V2 and −V2 depicted in FIG. 3(b) respectively denote the maximum and minimum values of the voltage detected by the stylus 2 at the position Pos_H. Further, V2<Vmax and −V2>Vmin.

Moreover, as is obvious from the comparison between FIGS. 3(c) and 3(a), the signal-to-noise (S/N) ratio at the position Pos_H is smaller, as a whole, than the S/N ratio at the position Pos_L. At time t1, for instance, the S/N ratio (=S2/N2) in the example of the FIG. 3(c) is smaller than the S/N ratio (=S1/N1) in the example of FIG. 3(a). The reason is that the amount of attenuation of the control signal US_cmd is larger than the amount of attenuation of the low-frequency noise UN.

As described above, when the low-frequency noise UN is superimposed upon the control signal US_cmd, the S/N ratio of the received signal decreases with an increase in the distance between the stylus 2 and the touch surface. Another aspect of the present disclosure is to properly receive the control signal US_cmd, even in the above situation where the S/N ratio is decreased, without using a high-power-consumption circuit such as the high-bit AD converter circuit 111 depicted in FIG. 10.

Figure 4:
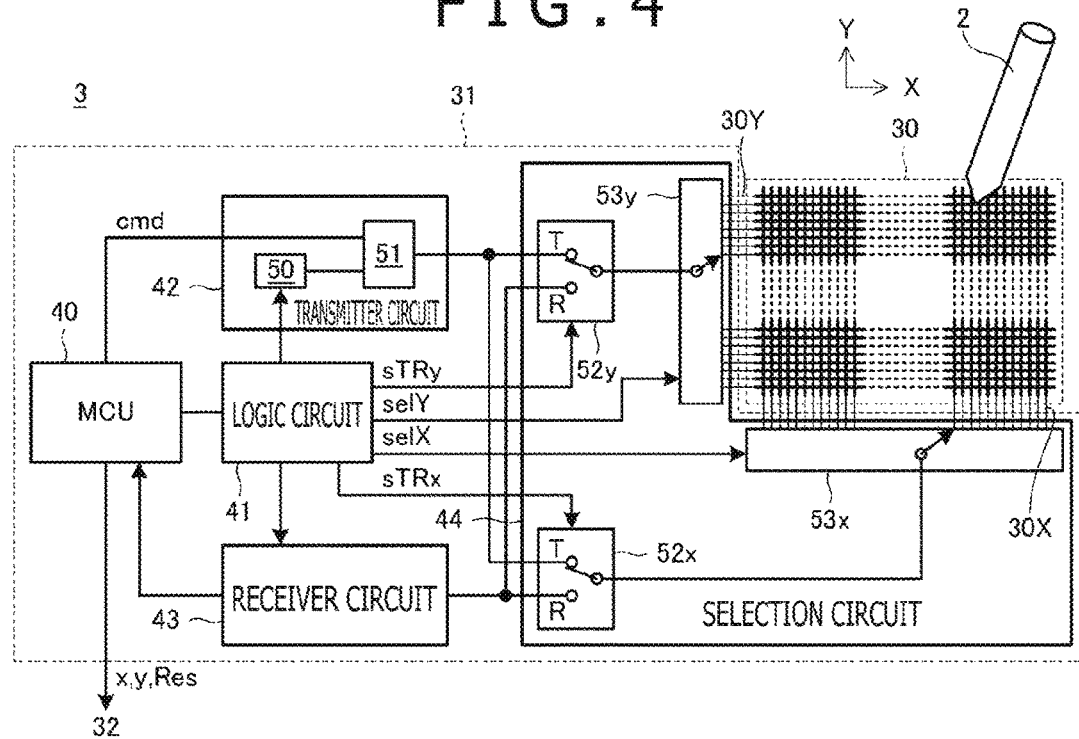
FIG. 4 is a diagram illustrating a detailed configuration of a tablet 3 depicted in FIG. 1.

FIG. 4 is a diagram illustrating a detailed configuration of the tablet 3. The configuration and operation of the tablet 3 will now be described in detail with reference to FIG. 4. The following description assumes that the control signal US_cmd is generated by using the spread spectrum code depicted in FIG. 2(a).

The sensor 30 includes a plurality of linear electrodes 30X and a plurality of linear electrodes 30Y. The linear electrodes 30X are extended in the X-direction. The linear electrodes 30Y are extended in the Y-direction. These linear electrodes 30X and 30Y capacitively couple the sensor 30 to an electrode 21 (described later) of the stylus 2. The control signal US_cmd is transmitted through such capacitive coupling.

As illustrated in FIG. 4, the sensor controller 31 includes a micro-controller unit (MCU) 40, a logic circuit 41, a transmitter circuit 42, a receiver circuit 43, and a selection circuit 44.

The MCU 40 and the logic circuit 41 are control circuits that control the transmission and reception operations of the sensor controller 31 by controlling the transmitter circuit 42, the receiver circuit 43, and the selection circuit 44. More specifically, the MCU 40 is a microprocessor that includes a read-only memory (ROM) and a random access memory (RAM), and operates in accordance with a predetermined program. Meanwhile, the logic circuit 41 generates control signals for the transmitter circuit 42, the receiver circuit 43, and the selection circuit 44 under the control of the MCU 40.

The MCU 40 not only receives a signal transmitted from the stylus 2 through the receiver circuit 43, but also generates a command cmd to be transmitted to the stylus 2 and supplies the generated command cmd to the transmitter circuit 42. The signal to be transmitted from the stylus 2 includes a position signal and a data signal. The position signal is an unmodulated carrier signal. The data signal includes data based on the command cmd. Upon receipt of the position signal from the stylus 2, the MCU 40 calculates the position coordinates (x, y) of the stylus 2 on the touch surface from the reception strength at each of the linear electrodes 30X and 30Y forming the sensor 30, and outputs the calculated position coordinates to the host processor 32. Upon receipt of the data signal from the stylus 2, the MCU 40 acquires response data Res (or more specifically, a unique ID, a pen pressure, switch on/off information, etc.) from the received data signal, and outputs the acquired response data Res to the host processor 32.

The transmitter circuit 42 is a circuit that generates the control signal US_cmd under the control of the MCU 40 and logic circuit 41. As illustrated in FIG. 4, the transmitter circuit 42 includes a code string storage circuit 50 and a spread processing circuit 51.

The code string storage circuit 50 generates and stores one or more spread spectrum codes in accordance with a control signal supplied from the logic circuit 41. The spread spectrum codes generated and stored in the above manner have autocorrelation characteristics and a predetermined chip length, and are "0x1AD3" and "0xE54C" in the example of FIG. 2(a). The one or more spread spectrum codes stored in the code string storage circuit 50 are supplied to the spread processing circuit 51.

The code string storage circuit 50 supplies the spread spectrum codes to the spread processing circuit 51. In addition, the MCU 40 supplies the command cmd to the spread processing circuit 51. The spread processing circuit 51 selects one of the spread spectrum codes stored in the code string storage circuit 50 for each of a plurality of bits included in the command cmd. In the example of FIG. 2(a), for instance, "0x1AD3" is selected for a bit value of "0," and "0xE54C" is selected for a bit value of "1." The selected spread spectrum code is then used to spread the value of each bit so as to generate an outgoing (transmission) chip sequence having a predetermined chip length. The generated transmission chip sequence is supplied to the selection circuit 44.

The receiver circuit 43 is a circuit that receives a signal transmitted from the stylus 2 in accordance with a control signal supplied from the logic circuit 41. More specifically, a signal supplied from the selection circuit 44 is decoded to generate a digital signal, which is supplied as a received signal to the MCU 40.

The selection circuit 44 includes switches 52x and 52y, and conductor selection circuits 53x and 53y.

The switches 52x and 52y are switching elements that connect a common terminal to either a T terminal or an R terminal. The common terminal of the switch 52x is connected to the conductor selection circuit 53x, the T terminal is connected to the output end of the transmitter circuit 42, and the R terminal is connected to the input end of the receiver circuit 43. The common terminal of the switch 52y is connected to the conductor selection circuit 53y, the T terminal is connected to the output end of the transmitter circuit 42, and the R terminal is connected to the input end of the receiver circuit 43.

The conductor selection circuit 53x is a switching element that selectively connects the linear electrodes 30X to the common terminal of the switch 52x. The conductor selection circuit 53x is capable of simultaneously connecting some or all of the linear electrodes 30X to the common terminal of the switch 52x.

The conductor selection circuit 53y is a switching element that selectively connects the linear electrodes 30Y to the common terminal of the switch 52y. The conductor selection circuit 53y is similarly capable of simultaneously connecting some or all of the linear electrodes 30Y to the common terminal of the switch 52y.

The logic circuit 41 supplies four control signals sTRx, sTRy, selX, and selY to the selection circuit 44. More specifically, the control signal sTRx is supplied to the switch 52x, the control signal sTRy is supplied to the switch 52y, the control signal selX is supplied to the conductor selection circuit 53x, and the control signal selY is supplied to the conductor selection circuit 53y. The logic circuit 41 uses the control signals sTRx, sTRy, selX, and selY to control the selection circuit 44 in such a manner as to transmit the control signal US_cmd and receive a signal transmitted from the stylus 2.

More specifically, when the control signal US_cmd is to be transmitted, the logic circuit 41 controls the selection circuit 44 in such a manner that the output end of the transmitter circuit 42 is connected to all the linear electrodes 30Y (or all the linear electrodes 30X) or to a predetermined number of linear electrodes 30X and 30Y that are in the vicinity of a position most recently derived for the stylus 2 which is a target of signal transmission. In the meantime, when the position signal is to be received, the logic circuit 41 controls the selection circuit 44 in such a manner that all the linear electrodes 30X and 30Y are sequentially connected to the input end of the receiver circuit 43 while the position signal is being transmitted. This enables the MCU 40 to acquire the reception strength of a burst signal at each of the linear electrodes 30X and 30Y. Consequently, the position of the stylus 2 can be derived as mentioned above. Meanwhile, when the data signal is to be received, the logic circuit 41 controls the selection circuit 44 in such a manner that the input end of the receiver circuit 43 is connected to a predetermined number of linear electrodes 30X and 30Y that are in the vicinity of a position derived by the most recent position signal for the stylus 2 transmitting the data signal.

The configuration and operation of the tablet 3 have been described above. Next, the configuration and operation of the stylus 2 will be described in detail.

Figure 5:
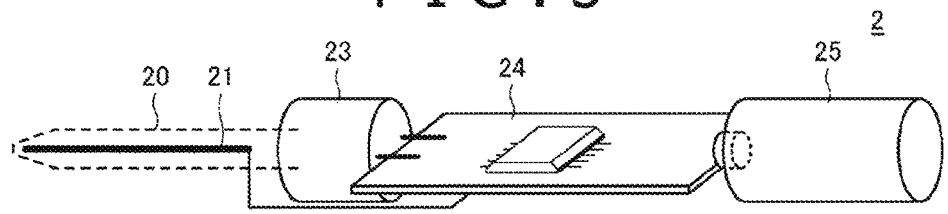
FIG. 5 is a diagram illustrating an internal structure of the stylus 2 depicted in FIG. 1.

FIG. 5 is a diagram illustrating an internal structure of the stylus 2. As illustrated in the figure, the stylus 2 includes a core 20, an electrode 21 (second electrode), a pen pressure detecting sensor 23, a circuit board 24, and a battery 25. Although not depicted, the stylus 2 additionally includes a user-operable switch that is mounted on a lateral or bottom surface of a housing.

The core 20 is a rod-like member and disposed so that the longitudinal direction of the core 20 coincides with the pen axis direction of the stylus 2. A conductive material is embedded in the core 20 to form the electrode 21. Note that the electrode 21 may alternatively be formed by applying a conductive material to the surface of the tip of the core 20.

The pen pressure detecting sensor 23 is physically connected to the core 20 and capable of detecting the pen pressure applied to the tip of the core 20. Specifically, the pen pressure detecting sensor 23 may be formed of a variable capacitor that varies its capacitance in accordance with the pen pressure.

The electrode 21 is electrically connected to the circuit board 24. The electrode 21 not only receives the control signal US_cmd transmitted from the tablet 3 and supplies the received control signal US_cmd to the circuit board 24, but also receives a signal supplied from the circuit board 24 and transmits the received signal toward the tablet 3. Although the electrode 21 is used here for both transmission and reception, an alternative is to separately provide a transmission electrode and a reception electrode, respectively. The battery 25 is a power supply that supplies operating power to, for example, various elements on the circuit board 24.

Figure 6:
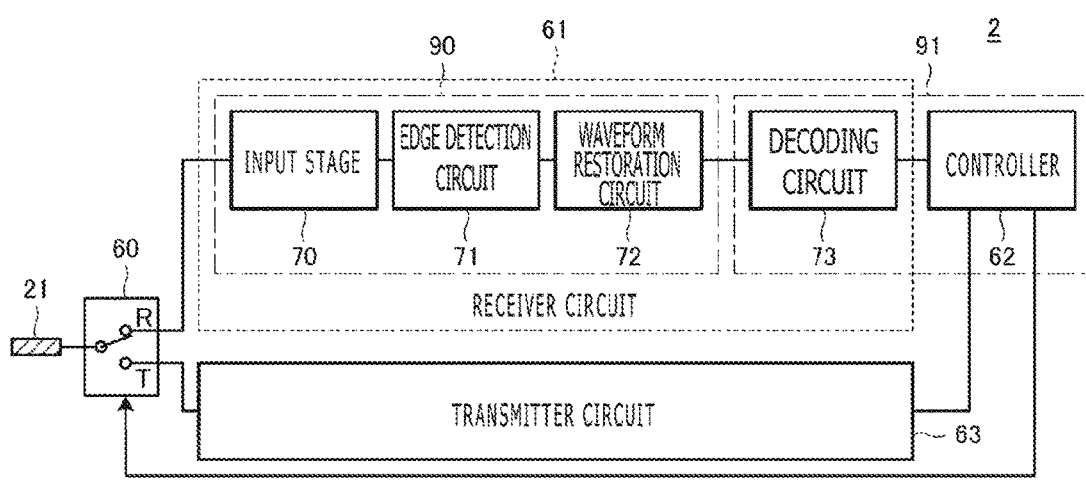
FIG. 6 is a schematic block diagram illustrating functional blocks of the stylus 2 depicted in FIG. 5.

FIG. 6 is a schematic block diagram illustrating functional blocks of the stylus 2. The functional blocks illustrated in the figure are implemented by electronic circuits formed on the circuit board 24.

As illustrated in FIG. 6, the stylus 2 functionally includes a switch 60, a receiver circuit 61, a controller 62, and a transmitter circuit 63.

The switch 60 is a switching element that connects a common terminal to either a T terminal or an R terminal. The common terminal of the switch 60 is connected to an electrode 21, the T terminal is connected to the output end of the transmitter circuit 63, and the R terminal is connected to the input end of the receiver circuit 61. The connection state of the switch 60 is controlled by the controller 62. When a signal (control signal US_cmd) is to be received from the sensor controller 31, the controller 62 controls the switch 60 in such a manner as to connect the common terminal to the R terminal. When a signal (position signal or data signal) is to be transmitted toward the sensor controller 31, the controller 62 controls the switch 60 in such a manner as to connect the common terminal to the T terminal.

The receiver circuit 61 acquires a digital signal (or more specifically, the control signal US_cmd) by demodulating a signal received through the electrode 21 and the switch 60, and outputs the acquired digital signal to the controller 62. As illustrated in FIG. 6, the receiver circuit 61 includes an input stage 70, an edge detection circuit 71, a waveform restoration circuit 72, and a decoding circuit 73. The input stage 70, the edge detection circuit 71, and the waveform restoration circuit 72 form an analog circuit 90. The decoding circuit 73 forms a digital circuit 91 that performs a digital operation. The digital circuit 91 additionally includes the controller 62.

The input stage 70 includes a circuit that amplifies a signal supplied from the switch 60. The edge detection circuit 71 is a circuit that detects the rising and falling edges of the control signal US_cmd from the signal amplified by the input stage 70. The waveform restoration circuit 72 is capable of restoring the waveform of the control signal US_cmd in accordance with the rising and falling edges detected by the edge detection circuit 71. The decoding circuit 73 decodes the control signal US_cmd in accordance with the waveform restored by the waveform restoration circuit 72, and outputs the decoded control signal US_cmd to the controller 62. Each of these circuits will be described in more detail later with reference to FIG. 7.

The controller 62 is a processor that includes a memory, and is adapted to operate in accordance with a program stored in the memory. The memory of the controller 62 additionally stores the unique ID of the stylus 2.

Operations performed by the controller 62 include a processing operation based on the control signal US_cmd supplied from the receiver circuit 61. More specifically, the controller 62 performs a process of determining the transmission/reception schedule of various signals in accordance with the control signal US_cmd supplied from the receiver circuit 61 and controlling the connection state of the switch 60 in accordance with the determined transmission/reception schedule. That is to say, as mentioned earlier, when a signal (control signal US_cmd) is to be received from the sensor controller 31, the controller 62 controls the switch 60 in such a manner as to connect the common terminal to the R terminal. When a signal (position signal or data signal) is to be transmitted toward the sensor controller 31, the controller 62 controls the switch 60 in such a manner as to connect the common terminal to the T terminal.

At a point of time when the position signal is transmitted in accordance with the determined transmission/reception schedule, the controller 62 performs a process of instructing the transmitter circuit 63 to transmit the position signal. Further, when a command designated by the control signal US_cmd supplied from the receiver circuit 61 is an instruction for transmitting various data (unique ID, pen pressure, and switch on/off information, etc.), the controller 62 performs a process of acquiring the designated data and supplying the acquired designated data to the transmitter circuit 63 as transmission data at a point of time when the data signal is transmitted in accordance with the determined transmission/reception schedule.

The transmitter circuit 63 includes an oscillation circuit for a predetermined carrier signal. When the controller 62 instructs the transmitter circuit 63 to transmit the position signal, the transmitter circuit 63 supplies the carrier signal to the electrode 21 without modulating the carrier signal. Meanwhile, when transmission data is supplied from the controller 62, the transmitter circuit 63 modulates the carrier signal with the supplied transmission data and supplies the modulated carrier signal to the electrode 21.

Figure 7:
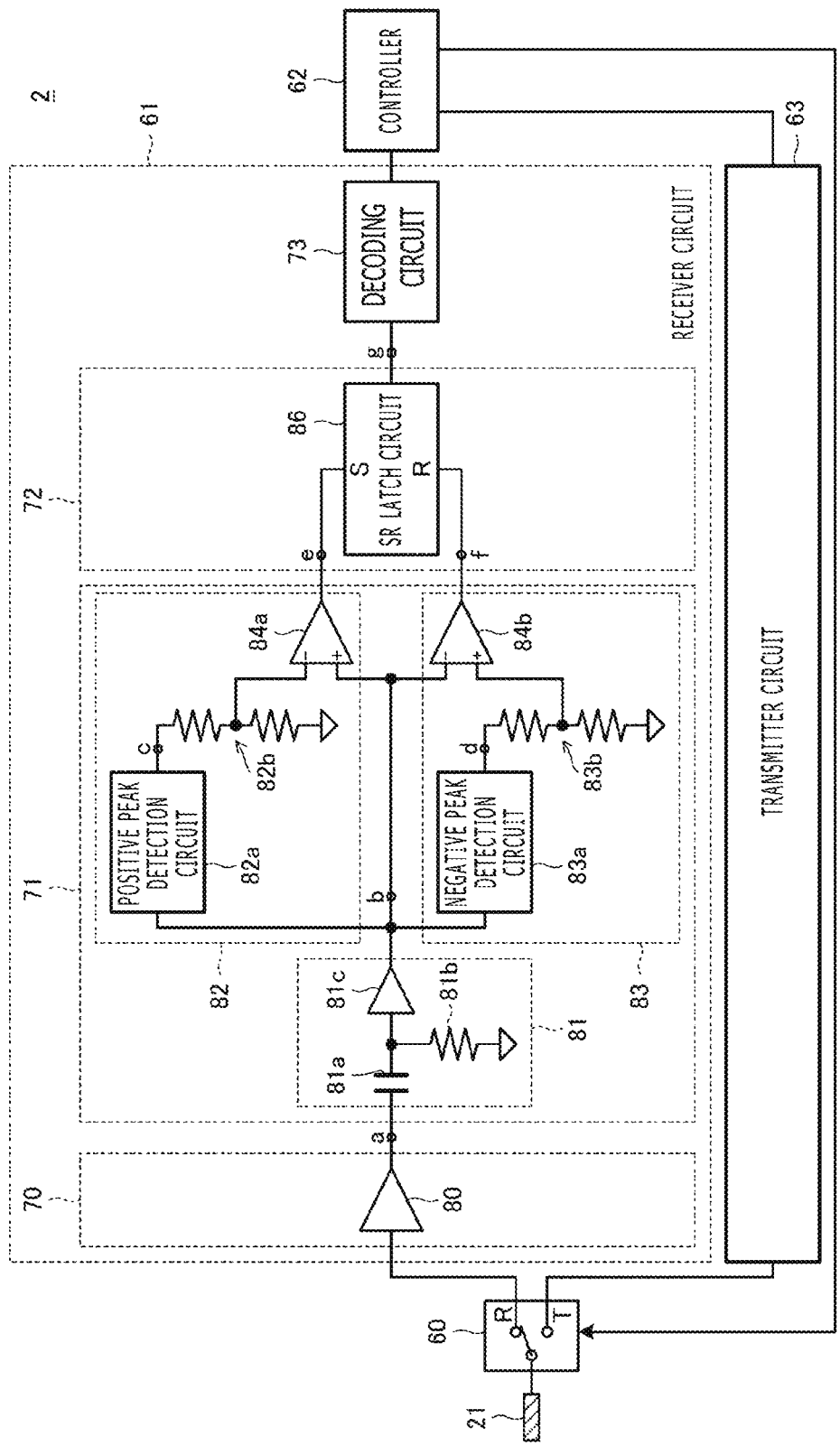
FIG. 7 is a schematic block diagram illustrating more detailed functional blocks of the stylus 2 depicted in FIG. 6.
Figure 8:
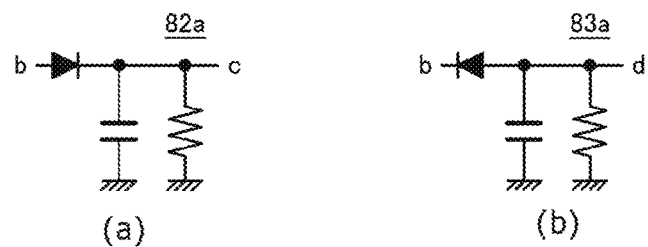
FIG. 8 includes diagrams illustrating examples of a peak detection circuit.
Figure 9:
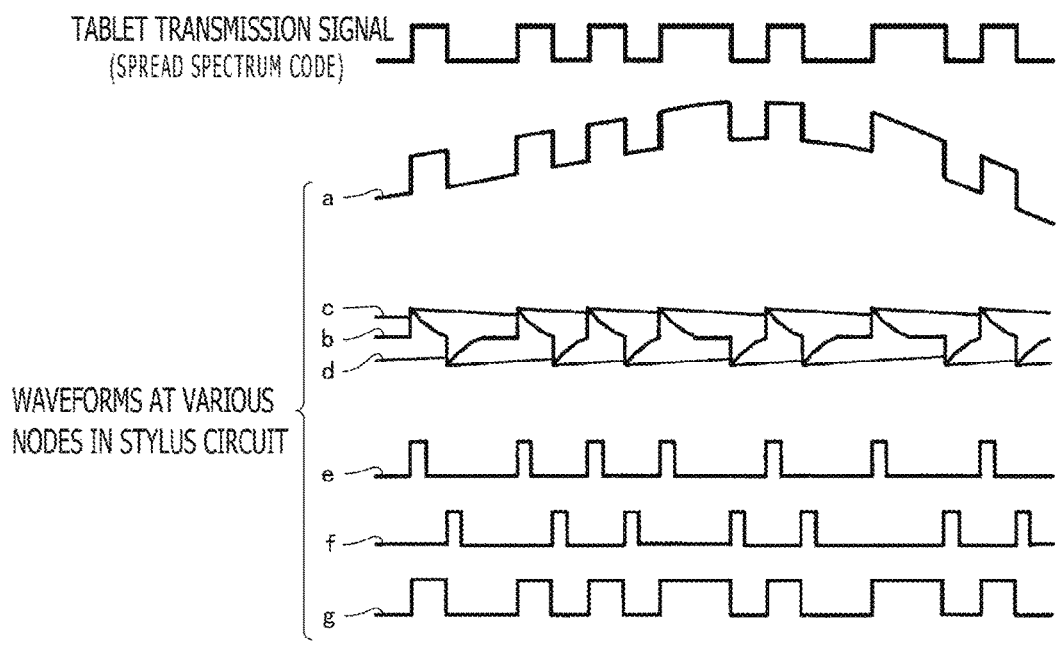
FIG. 9 is a diagram illustrating the waveform of the control signal US_cmd (tablet transmission signal) transmitted from the tablet 3 depicted in FIG. 1 and the waveforms of signals observed at nodes a to g in the stylus 2 depicted in FIG. 7.

FIG. 7 is a schematic block diagram illustrating more detailed functional blocks of the stylus 2 depicted in FIG. 6. FIG. 8(a) is a diagram illustrating a concrete example of a configuration of a positive peak detection circuit 82a depicted in FIG. 7. FIG. 8(b) is a diagram illustrating a concrete example of a configuration of a negative peak detection circuit 83a depicted in FIG. 7. FIG. 9 is a diagram illustrating the waveform of the control signal US_cmd (tablet transmission signal) transmitted from the tablet 3 (the spread spectrum code illustrated in FIG. 2(a)) and the waveforms of signals observed at nodes a to g in the stylus 2 depicted in FIG. 7. Hereinafter, referring to these figures, processes performed by various circuits of the receiver circuit 61 will now be described in more detail.

The input stage 70 includes an amplifier circuit 80 that is formed of an operational amplifier. The amplifier circuit 80 amplifies a signal supplied from the switch 60 and supplies the amplified signal to the edge detection circuit 71. The signal observed at the output end (node a) of the input stage 70 is obtained by superimposing the low-frequency noise UN (see FIG. 1) upon the control signal US_cmd as depicted in FIG. 9.

The edge detection circuit 71 includes a differential circuit 81, a positive direction pulse detection circuit 82, and a negative direction pulse detection circuit 83.

The differential circuit 81 generates the differential signal from a signal supplied by the input stage 70, and includes a capacitor 81a, a resistive element 81b, and a buffer 81c. The capacitor 81a and the buffer 81c are series-connected, in this order, between node a and the output end (node b) of the edge detection circuit 71. The resistive element 81b is connected between a ground point and a connection point between the capacitor 81a and the buffer 81c. As depicted in FIG. 9, the signal observed at node b has an amplitude based on the amount of change in a signal appearing at node a.

The positive direction pulse detection circuit 82 detects the rising edge of the control signal US_cmd in accordance with the output signal of the differential circuit 81, and includes a positive peak detection circuit 82a, a voltage divider circuit 82b (first voltage divider circuit), and a comparator 84a (first comparator).

The positive peak detection circuit 82a detects a positive peak of the output signal of the differential circuit 81. As illustrated in FIG. 8(a), a concrete example of the positive peak detection circuit 82a includes a diode, a capacitor, and a resistive element. The diode is connected at its anode to node b and at its cathode to the output end (node c) of the positive peak detection circuit 82a. The capacitor and the resistive element are both connected between node c and the ground end. As illustrated in FIG. 9, the signal observed at node c is obtained by holding the plus peak of the output signal of the differential circuit 81. However, the amplitude of the signal observed at node c drastically increases when the output signal of the differential circuit 81 reaches its plus peak, and then gradually decreases. As is understandable from the configuration illustrated in FIG. 8(a), the reason is that an electrical charge stored in the capacitor is gradually discharged through the resistive element.

The voltage divider circuit 82b decreases the absolute value of the output voltage of the positive peak detection circuit 82a. Specifically, the voltage divider circuit 82b is formed of a resistor divider circuit as depicted in FIG. 7.

The comparator 84a includes an inverted input terminal, a non-inverted input terminal, and an output terminal. The output signal of the voltage divider circuit 82b is supplied to the inverted input terminal. The non-inverted input terminal is connected to node b. The output terminal is connected to an S input (node e) of a later-described SR latch circuit 86. The comparator 84a outputs a signal based on the difference between an input voltage at the inverted input terminal (the output signal of the voltage divider circuit 82b) and an input voltage at the non-inverted input terminal (the output signal of the differential circuit 81). As depicted in FIG. 9, the signal observed at node e (the output signal of the comparator 84a) is a pulse signal that peaks at a point of time when the output signal of the differential circuit 81 reaches its plus peak.

The negative direction pulse detection circuit 83 detects the falling edge of the control signal US_cmd in accordance with the output signal of the differential circuit 81, and includes a negative peak detection circuit 83a, a voltage divider circuit 83b (second voltage divider circuit), and a comparator 84b (second comparator).

The negative peak detection circuit 83a detects a negative peak of the output signal of the differential circuit 81. As illustrated in FIG. 8(b), a concrete example of the negative peak detection circuit 83a includes a diode, a capacitor, and a resistive element. The diode is connected at its cathode to node b and at its anode to the output end (node d) of the negative peak detection circuit 83a. The capacitor and the resistive element are both connected between node d and the ground end. As illustrated in FIG. 9, the signal observed at node d is obtained by holding the minus peak of the output signal of the differential circuit 81. However, the amplitude of the signal observed at node d drastically decreases when the output signal of the differential circuit 81 reaches its minus peak, and then gradually increases. As is the case with the positive peak detection circuit 82a, the reason is that an electrical charge in the capacitor depicted in FIG. 8(b) is gradually discharged through the resistive element.

The voltage divider circuit 83b decreases the absolute value of the output voltage of the negative peak detection circuit 83a. Specifically, the voltage divider circuit 83b is formed of the same resistor divider circuit as used in the voltage divider circuit 82b.

The comparator 84b includes a non-inverted input terminal, an inverted input terminal, and an output terminal. The output signal of the voltage divider circuit 83b is supplied to the non-inverted input terminal. The inverted input terminal is connected to node b. The output terminal is connected to an R input (node f) of the later-described SR latch circuit 86. The comparator 84b outputs a signal based on the difference between an input voltage at the non-inverted input terminal (the output signal of the voltage divider circuit 83b) and an input voltage at the inverted input terminal (the output signal of the differential circuit 81). As depicted in FIG. 9, the signal observed at node f (the output signal of the comparator 84b) is a pulse signal that peaks at a point of time when the output signal of the differential circuit 81 reaches its minus peak.

The waveform restoration circuit 72 includes an SR latch circuit 86. The SR latch circuit 86 includes an S input, an R input, and an output terminal. The output signal of the comparator 84a is supplied to the S input. The output signal of the comparator 84b is supplied to the R input. The output terminal is connected to the input end (node g) of the decoding circuit 73. The SR latch circuit 86 operates so as to be set (i.e., its output goes high) when the S input rises, and reset (i.e., its output goes low) when the R input rises. Consequently, as illustrated in FIG. 9, the signal observed at node g (the output signal of the SR latch circuit 86) is a digital signal that has the same waveform as the control signal US_cmd transmitted from the tablet 3. That is to say, the signal outputted from the SR latch circuit 86 is obtained by restoring the control signal US_cmd.

As described above, the analog circuit 90 (see FIG. 6) in the receiver circuit 61 according to the present embodiment makes it possible to properly restore the control signal US_cmd upon which the low-frequency noise UN is superimposed although multi-level sampling is not performed.

The decoding circuit 73 is capable of restoring the control signal US_cmd in accordance with the waveform restored by the waveform restoration circuit 72. More specifically, chips sequentially supplied from the waveform restoration circuit 72 are sequentially stored in a shift register (not depicted), and a correlation value with respect to each of the aforementioned two different spread spectrum codes "0x1AD3" and "0xE54C" is calculated upon storage. When the correlation value exhibits its peak, bits forming the control signal US_cmd are detected and then outputted to the controller 62. From a string of bits supplied in the above manner, the controller 62 acquires the command transmitted by the sensor controller 31.

As described above, the stylus 2 according to the present embodiment makes it possible to suitably restore the waveform of the control signal US_cmd even when the low-frequency noise UN is superimposed upon the control signal US_cmd. As the noise substantially detrimental to the stylus 2 is limited to the low-frequency noise UN, it can be said that the present disclosure provides a noise-immune analog circuit 90 for a stylus.

Further, the stylus 2 according to the present embodiment makes it possible to restore the waveform of the control signal US_cmd without performing multi-level sampling. Therefore, lower power consumption can be achieved than the example depicted in FIG. 10, which uses the high-bit AD converter circuit 111.

While the present disclosure has been described in conjunction with a presently preferred embodiment of the present disclosure, persons of skill in the art will appreciate that the present disclosure is not limited to the presently preferred embodiment, and that various modifications and variations can be made without departing from the spirit and scope of the present disclosure.

For example, the presently preferred embodiment has been described to illustrate the present disclosure on the assumption that the control signal US_cmd is spread by using a known spread spectrum code (see FIG. 2(a)). However, the present disclosure is also applicable to a case where the control signal US_cmd is modulated by phase shift keying (PSK) (see FIG. 2(b)), and to a case where the control signal US_cmd is baseband-transmitted (see FIG. 2(c)).

DESCRIPTION OF REFERENCE SYMBOLS

1 Position detection system
2 Stylus
3 Tablet
20 Core
21 Electrode
23 Pen pressure detecting sensor
24 Circuit board
25 Battery
30 Sensor
30X, 30Y Linear electrode
31 Sensor controller
32 Host processor
33 Charger
40 MCU
41 Logic circuit
42 Transmitter circuit
43 Receiver circuit
44 Selection circuit
50 Code string storage circuit
51 Spread processing circuit
52x, 52y, 60 Switch
53x, 53y Conductor selection circuit
61 Receiver circuit
62 Controller
63 Transmitter circuit
70 Input stage
71 Edge detection circuit
72 Waveform restoration circuit
73 Decoding circuit
80 Amplifier circuit
81 Differential circuit
81a Capacitor
81b Resistive element
81c Buffer
82 Positive direction pulse detection circuit
82a Positive peak detection circuit
82b Voltage divider circuit
83 Negative direction pulse detection circuit
83a Negative peak detection circuit
83b Voltage divider circuit
84a, 84b Comparator
86 SR latch circuit
90 Analog circuit
91 Digital circuit

The invention claimed is:

1. A position indicator comprising:
an electrode that receives a control signal by capacitive coupling; and
a receiver circuit that decodes the control signal received by the electrode; wherein
the receiver circuit includes
  a) an edge detection circuit that detects rising and falling edges of the control signal received by the electrode, the edge detection circuit including:
    a differential circuit that receives, as an input, the control signal received by the electrode, and detects the rising and falling edges in accordance with an output signal of the differential circuit,
    a positive direction pulse detection circuit that detects the rising edge in accordance with the output signal of the differential circuit, the positive direction pulse detection circuit including a first comparator,
    a negative direction pulse detection circuit that detects the falling edge in accordance with the output signal of the differential circuit, the negative direction pulse detection circuit including a second comparator, and
    a waveform restoration circuit that restores the waveform of the control signal in accordance with the output signals of the first and second comparators, wherein the waveform restoration circuit includes a latch circuit that keeps generating high-level outputs after when the output signal of the first comparator rises until when the output of the second comparator rises, and keeps generating low-level outputs after when the output signal of the second comparator rises until when the output of the first comparator rises; and
  b) a decoding circuit that decodes the control signal in accordance with the waveform restored by the waveform restoration circuit.

2. The position indicator according to claim 1, wherein the positive direction pulse detection circuit includes
a positive peak detection circuit that detects a positive peak of the output signal of the differential circuit,
a first voltage divider circuit that decreases the absolute value of an output voltage of the positive peak detection circuit, and the first comparator that outputs a signal based on the difference between the output voltage of the first voltage divider circuit and the output voltage of the differential circuit; and the negative direction pulse detection circuit includes
a negative peak detection circuit that detects a negative peak of the output signal of the differential circuit,
a second voltage divider circuit that decreases the absolute value of an output voltage of the negative peak detection circuit, and
the second comparator that outputs a signal based on the difference between the output voltage of the second voltage divider circuit and the output signal of the differential circuit.

3. The position indicator according to claim 1, wherein the control signal is spread by using a defined spread spectrum code.

4. The position indicator according to claim 1, wherein the control signal is modulated by phase shift keying.

5. The position indicator according to claim 1, wherein the control signal is baseband-transmitted.

6. A system comprising:
a tablet; and
a position indicator; wherein
the tablet includes
a sensor controller that generates a control signal in accordance with a command indicative of an instruction for the position indicator, and
a first electrode that transmits the control signal;
the position indicator includes
a second electrode that receives the control signal by capacitive coupling with the first electrode, and
a receiver circuit that decodes the control signal received by the second electrode; and
the receiver circuit includes
a) an edge detection circuit that detects rising and falling edges of the control signal received by the second electrode, the edge detection circuit including:
a differential circuit that receives, as an input, the control signal received by the electrode, and detects the rising and falling edges in accordance with an output signal of the differential circuit,
a positive direction pulse detection circuit that detects the rising edge in accordance with the output signal of the differential circuit, the positive direction pulse detection circuit including a first comparator,
a negative direction pulse detection circuit that detects the falling edge in accordance with the output signal of the differential circuit, the negative direction pulse detection circuit including a second comparator, and
a waveform restoration circuit that restores the waveform of the control signal in accordance with the output signals of the first and second comparators, wherein the waveform restoration circuit includes a latch circuit that keeps generating high-level outputs after when the output signal of the first comparator rises until when the output of the second comparator rises, and keeps generating low-level outputs after when the output signal of the second comparator rises until when the output of the first comparator rises; and
b) a decoding circuit that decodes the control signal in accordance with the waveform restored by the waveform restoration circuit.

7. The system according to claim 6, wherein the control signal is spread by using a defined spread spectrum code.

8. The system according to claim 6, wherein the control signal is modulated by phase shift keying.

9. The system according to claim 6, wherein the control signal is baseband-transmitted.

10. The system according to claim 6, wherein
the positive direction pulse detection circuit includes
a positive peak detection circuit that detects a positive peak of the output signal of the differential circuit,
a first voltage divider circuit that decreases the absolute value of an output voltage of the positive peak detection circuit, and
the first comparator that outputs a signal based on the difference between the output voltage of the first voltage divider circuit and the output voltage of the differential circuit; and
the negative direction pulse detection circuit includes
a negative peak detection circuit that detects a negative peak of the output signal of the differential circuit,
a second voltage divider circuit that decreases the absolute value of an output voltage of the negative peak detection circuit, and
the second comparator that outputs a signal based on the difference between the output voltage of the second voltage divider circuit and the output signal of the differential circuit.

\* \* \* \* \*